(12) United States Patent
Goldman

(10) Patent No.: US 6,442,318 B1
(45) Date of Patent: Aug. 27, 2002

(54) PREFABRICATED OPTICAL FIBER RIBBON CABLE FOR CONNECTORIZING WITH A TERMINAL CONNECTOR AND METHODS OF CONNECTORIZING AND FABRICATING THE SAME

(75) Inventor: Paul D. Goldman, Marlboro, MA (US)

(73) Assignee: Schott Fiber Optics, Inc., Southbridge, MA (US)

( * ) Notice: Subject to any disclaimer, the term of this patent is extended or adjusted under 35 U.S.C. 154(b) by 28 days.

(21) Appl. No.: 09/718,434

(22) Filed: Nov. 22, 2000

Related U.S. Application Data

(60) Provisional application No. 60/166,984, filed on Nov. 23, 1999.

(51) Int. Cl.[7] .................................................. G02B 6/44
(52) U.S. Cl. ...................................................... 385/114
(58) Field of Search ........................... 385/59, 114, 115, 385/116

(56) References Cited

U.S. PATENT DOCUMENTS

| 3,864,018 | A |   | 2/1975  | Miller            |        |
|-----------|---|---|---------|-------------------|--------|
| 3,871,935 | A |   | 3/1975  | Gloge et al.      |        |
| 3,920,432 | A |   | 11/1975 | Smith             |        |
| 4,142,776 | A |   | 3/1979  | Cherin et al.     |        |
| 4,160,580 | A |   | 7/1979  | Noane et al.      |        |
| 4,755,020 | A | * | 7/1988  | Willis et al.     | 385/109 |
| 4,980,007 | A |   | 12/1990 | Ferguson          |        |
| 5,076,881 | A |   | 12/1991 | Ferguson          |        |
| 5,093,881 | A |   | 3/1992  | Bortolin          |        |
| 5,208,889 | A |   | 5/1993  | Cedrone et al.    |        |
| 5,257,334 | A |   | 10/1993 | Takahashi         |        |
| 5,268,979 | A | * | 12/1993 | Weidman           | 385/42 |
| 5,339,377 | A |   | 8/1994  | Takahashi         |        |
| 5,459,804 | A | * | 10/1995 | Stowe             | 385/42 |
| 5,574,817 | A |   | 11/1996 | Henson et al.     |        |
| 5,611,017 | A |   | 3/1997  | Lee et al.        |        |
| 5,806,175 | A |   | 9/1998  | Underwood         |        |
| 5,850,494 | A |   | 12/1998 | O'Dell            |        |
| 6,243,520 | B1| * | 6/2001  | Goldman           | 385/115 |

* cited by examiner

Primary Examiner—Brian Sircus
Assistant Examiner—Thanh-Tam Le
(74) Attorney, Agent, or Firm—Louis J. Franco

(57) ABSTRACT

An optical fiber ribbon cable includes at least two optical fibers with their centers maintained in spaced relationship by at least one spacer fiber in abutting relationship with and between the optical fibers. The optical fibers and the at least one spacer fiber are maintain together and protected by an encapsulation layer. The optical fibers are made from a material that is relatively insoluble in at least one solution in which the encapsulation layer and the spacer fibers are relatively soluble. The optical fiber cable is connectorized to a multifiber terminal connector by dissolving the encapsulation layer and the spacer fibers along a some length of the ribbon cable, inserting the remaining optical fiber segments into corresponding fiber-receiving channels within the terminal connector and securing the fiber segments within the fiber-receiving channels.

21 Claims, 16 Drawing Sheets

A method of connectorizing a multifiber terminal connector to an optical fiber cable comprising the steps of:

↓ providing a multifiber terminal connector adapted for terminating an optical fiber ribbon cable and having a plurality of laterally spaced fiber-receiving channels for receiving and supporting a corresponding plurality of optical fibers; 710

↓ providing an optical fiber cable having at least one connectorization region in which at least two adjacent, laterally spaced optical fibers having fiber centers are maintained with their fiber centers separated by a distance that is within predetermined center-to-center spacing tolerances by at least one spacer fiber abuttingly positioned between the adjacent optical fibers, the optical fibers and the at least one spacer fiber being normally supported in a generally planar configuration by an encapsulation layer, the optical fibers, encapsulation layer and the at least one spacer fiber being fabricated from first, second and third materials respectively; 720

↓ providing an end surface generally perpendicular to the fiber axes within a connectorization region of the at least one connectorization regions; 730

↓ leaching a section of the connectorization region beginning at the end surface and extending along the connectorization region for a leach-depth in one of (i) a single, common solution that will dissolve both the second and third materials from which the encapsulation layer and the spacer fibers are fabricated, but not the first material from which the optical fibers are fabricated and (ii) a first solution that will dissolve the encapsulation layer and a second solution that will dissolve the spacer fibers, but neither of which first and second solutions will dissolve the optical fibers, such that there remain exposed fiber segments of the at least two optical fibers protruding from an unleached remainder of the connectorization region; 740

↓ inserting the protruding fiber segments into corresponding fiber-receiving channels of the multifiber terminal connector; and 750

↓ securing the optical fiber segments within their corresponding fiber receiving channels. 760

FIG. 6

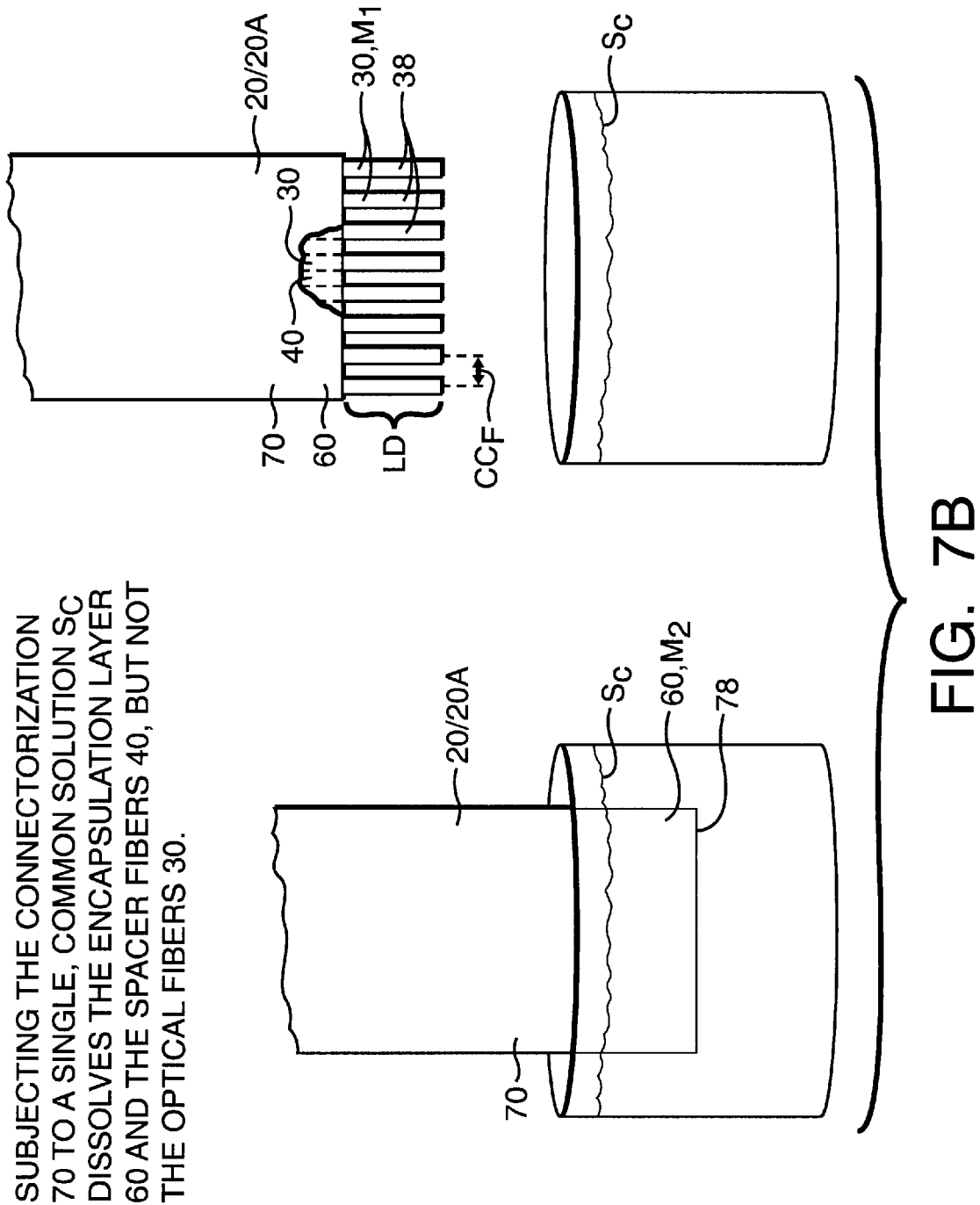

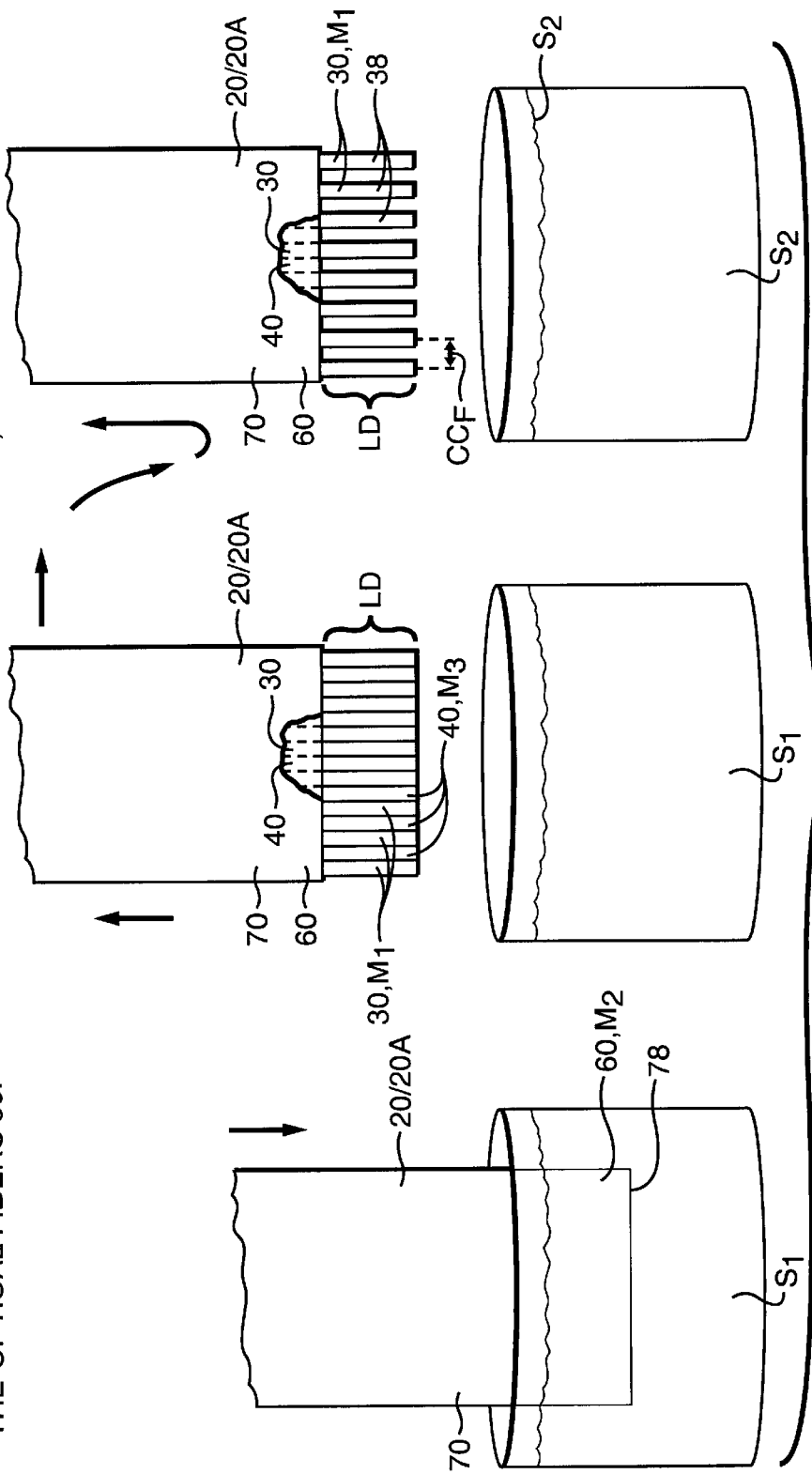

A method of fabricating an optical fiber cable for connectorizing with a multifiber terminal connector comprising the steps of:

predetermining the desired center-to-center spacing that adjacent optical fibers are to have when normally oriented in a substantially planar configuration in the at least one connectorization region and providing a plurality of optical fibers for inclusion within the optical fiber cable, each of which has a fiber center, a fiber height and a predetermined optical fiber width, the optical fibers being fabricated from a first material; 810 providing at least one spacer fiber fabricated from a third material for positioning in lateral abutting relationship between first and second adjacent optical fibers within the plurality of optical fibers such that, with respect to each set of first and second adjacent optical fibers to be spaced apart, one half the optical fiber width of the first optical fiber plus one half the optical fiber width of the second optical fiber plus the sum of the spacer fiber widths of the at least one spacer fiber to be abuttingly positioned between the first and second optical fibers is equal to the predetermined center-to-center spacing within a connectorization region; 820 arranging and temporarily restraining the first and second optical fibers of each set of adjacent optical fibers to be spaced apart in lateral abutting relationship with at least one spacer fiber positioned therebetween such that the center-to-center spacing between the first and second optical fibers is within acceptable predetermined tolerances over some length along the at least one spacer fiber; and
830 applying an encapsulation layer comprising a second material to the restrained optical fibers and the at least one spacer fiber to form a precisely ribbonized connectorization region in which the optical fibers and the at least one spacer fiber are supported by the encapsulation layer in lateral abutting relationship, the second material from which the encapsulation layer is fabricated being more soluble in a first solution than the first material and the third material from which the spacer fibers are fabricated being more soluble in a second solution than the first material. 840

FIG. 8

PREFABRICATED OPTICAL FIBER RIBBON CABLE FOR CONNECTORIZING WITH A TERMINAL CONNECTOR AND METHODS OF CONNECTORIZING AND FABRICATING THE SAME

PRIORITY BASED ON PREVIOUSLY FILED PROVISIONAL APPLICATION

Priority based on a previously filed provisional patent application is claimed. The provisional application upon which priority is based is Ser. No. 60/166,984 filed Nov. 23, 1999.

BACKGROUND

The use of optical fiber ribbons as cables for the transmission of optical signals is well known in the communications industry. In a typical optical fiber ribbon, plural optical fiber waveguides are arranged and retained adjacent to one another in a generally planar orientation and encased in a common outer jacket. Until recently, the use of ribbonized optical fiber cables had been limited to long-haul trunking installations where the superior transmission efficiency and other transmission characteristics of optical fibers, as opposed to metallic conduits, for example, justified the greater expense and difficulties presented by their manufacture and installation in the field. As the demands on communications media continue to increase, more research and development effort is being dedicated to finding practical, simple and inexpensive ways to apply optical fiber cables, including ribbonized cables, to the transmission of signals over shorter distances for the interconnection of local devices, for example.

A weak link in the application of optical fiber ribbon cables generally has been the difficulty of splicing and connecting the individual fibers in a fiber ribbon cable with those of another, similar ribbon cable or and/or with signal-transmitting or signal-receiving equipment, for example. The industry has attempted to solve this problem by developing numerous prefabricated terminal connectors of various configurations for installation on the ends of optical fiber ribbon cables. Although these terminal connectors have alleviated some of the difficulties of interfacing two fiber ribbon cables in series once the connectors are installed on the ends of two ribbon cables to be joined, for example, practical difficulties still remain with attaching such terminal connectors to the ribbon cables themselves. The problem is particularly vexing for on-site field technicians attempting to repair and maintain previously installed ribbon cables. As a result, substantial research and development resources are still being expended to find better ways of fabricating optical fiber ribbon cables and terminal connectors, and of connecting prefabricated ribbon cables to prefabricated terminal connectors. The principal objective of these efforts is to create optical fiber ribbon cables and terminal connectors that are capable of easy and precise field connectorization. An important consideration in any such effort is that the end surfaces of the individual optical fibers within an optical fiber ribbon cable must align precisely with the signal-receiving or signal-emitting apparatus with which they are to interface to obtain a low-loss connection.

At present, there are two primary prefabricated multifiber terminal connectors: (1) AT&T's MAC™ and (2) the MT™ connector made by U.S. Conec. Of these two, only the MT™ connector lends itself to installation in the field, albeit, not simply. When a field technician desires to install an MT™ connector onto an existing fiber ribbon cable, the technician cuts the ribbon cable. The insulation jacket surrounding the ribbon cable is typically slit longitudinally to allow the insulation jacket to be peeled back. If the ribbon cable is cut too deeply at this point, the optical fibers could be damaged. After peeling back the insulation jacket, the technician is left with a fiber ribbon comprising a ribbon coating (e.g., plastic) encapsulating plural optical fibers.

Frequently, a hot blade stripper is used to strip the ribbon coating from the optical fiber. This tool heats the entire end of the ribbon and has two blades that move towards one another to cut the ribbon coating and pull the coating off the optical fibers. This step sometimes causes damage to the fibers because it is very easy to cut too deeply with the blades. Once the individual optical fibers are exposed and cleaned to remove any remaining coating residue or foreign particles, the connector must be filled with an appropriate quantity of adhesive and the individual fibers manually inserted through laterally spaced guide holes in the connector. Once this is done, the adhesive is cured to secure the fibers on the connector.

Although optical fiber ribbon cables have made the use of optical fibers in and as data conduits somewhat more ubiquitous, currently available methods of stripping and connecting (i.e., splicing) optical fiber ribbon cables are labor intensive and time consuming, require a great degree of skill and care and subject the optical fibers to potential damage due to the difficulty in stripping the protective jacket and buffer from the individual optical fibers.

Attempts have been made to alleviate the difficulty and time-intensiveness of optical fiber ribbon connectorization. One such attempt is discussed in U.S. Pat. No. 5,611,017 to Lee et al. for a Fiber Optic Ribbon Cable with Pre-installed Locations for Subsequent Connectorization. U.S. Pat. No. 5,611,017 teaches a fiber optic ribbon cable that has release elements manufactured in line with the ribbon cable. The release elements provide access points to the optical fibers contained therein to allow for simplified application of a connector in the field. A pair of adhesive tape layers is applied about the optical fibers to create a fiber optic ribbon cable. When it is desired to equip the ribbon cable with a connector, the cable is cut perpendicularly to the fiber axes near the midpoint of the access points. Once the cable is cut, the adhesive tape layers and the pieces of release element may be peeled back to expose the individual optical fibers. A connector is then installed onto the exposed optical fibers, the pieces of release element removed from the tape layers and the tape layers secured to the connector. Among the drawbacks of this technique are that it requires the inclusion of release elements in line with the ribbon cable. These release elements are described as being made of plastic or ceramic, but whatever the material from which they are fabricated, their presence may constitute irregular bulges along the length of the cable. Furthermore, the inclusion of the release elements introduces numerous stress points throughout the length of the cable that may result in damage to the individual optical fibers. Still further, because of the nature of the in-line access points, one needing to install a connector at such an access point will need to locate the midpoint of the release elements with a fair degree of accuracy for cutting of the cable.

SUMMARY

The present invention is directed to a prefabricated optical fiber cable for subsequent connectorization to a prefabricated connector, methods of fabricating the prefabricated optical fiber cable and methods of connectorizing a prefabricated optical fiber cable to a prefabricated multifiber terminal connector.

In one embodiment, an optical fiber ribbon cable comprises a plurality of elongated laterally spaced wave-transmitting optical fibers. The lateral center-to-center spacing of the optical fibers within the ribbon cable is maintained within predetermined tolerances by the inclusion of spacer fibers between adjacent optical fibers. The optical fibers and the spacer fibers are maintained in their desired positions, and protected from damage, by an encapsulation layer. The fabrication of the optical fiber ribbon cable may be such that the lateral spacing of the optical fibers is maintained by the spacer fibers along the entirety of a length of ribbon cable. The optical fibers are for transmitting signals, while the spacer fibers exist for the purpose of establishing and maintaining the lateral spacing of the optical fibers. The widths of the optical fibers and the spacer fibers are two parameters that may be varied in order to fabricate optical fiber ribbon cables for connectorization with prefabricated multifiber terminal connectors of various designs and dimensions, of which the MT™ Connector is only a single example.

The materials from which the encapsulation layer, the spacer fibers and the optical fibers are each comprised are chosen based on their relative solubilities in certain solutions. More specifically, the encapsulating layer and the spacer fibers each comprise a material that is soluble in a particular solution relative to the solubility of the optical fibers in the same solution or solutions. For example, the encapsulating layer and spacer fibers may each be soluble in one or both of a particular acid and/or acetone, while the optical fibers are made from a material that is not soluble in either acetone or the particular acid. In one version, the spacer fibers and the encapsulation layer are made from the same material as one another.

When it is desired to install a multifiber terminal connector onto the optical fiber ribbon cable, the cable may be cut generally perpendicularly to the optical fiber axes. Next, a short section of at least the encapsulation layer is leached away using an appropriate solution. If the same solution used to leach the encapsulation layer will also dissolve the spacer fibers, then the dissolution of the encapsulation layer and the spacer fibers may be performed as a single step. However, if this is not the case, then once the encapsulation layer has been dissolved in a first solution, there will remain protruding from the undissolved portion of the encapsulation layer, an array of exposed optical fibers and spacer fibers. The exposed optical fibers and spacer fibers may then be subjected to a second solution that will dissolve the spacer fibers, but not the optical fibers. In either event, once all necessary dissolution steps have been performed, there will remain a plurality of optical fibers segments protruding from the undissolved portion of the ribbon. Where the dissolved length along which the encapsulation layer and the spacer fibers is not too great, the optical fiber segments will be maintained at substantially their original spacing.

To install a multifiber terminal connector onto the end of the optical fiber ribbon cable, the optical fiber segments are inserted into corresponding fiber-receiving channels in the terminal connector and secured in place with adhesive, for example. The optical fiber ribbon cables and the terminal connectors are chosen such that the lateral center-to-center spacing of the optical fiber segments corresponds to the center-to-center spacing of the fiber-receiving channels in the terminal connector with which the ribbon cable is to be connected. In this way, the optical fiber segments may be inserted into the corresponding fiber-receiving channels simultaneously, instead of individually.

In alternatives embodiments, the spacer fibers are not included over the entire length of the optical fiber ribbon cable; instead, the ribbon cable is fabricated to include at least one "connectorization region." A connectorization region is a portion of the optical fiber ribbon cable along which the center-to-center spacing tolerances of the optical fibers are maintained by spacer fibers as generally described previously (i.e., "precisely ribbonized)." By including a plurality of connectorization regions spaced at intervals along the length of an optical fiber ribbon cable, the advantages of precision ribbonizing by including spacer fibers may be generally realized without the need for including spacer fibers, and maintaining center-to-center spacing tolerances, over the entire length of optical fiber ribbon cable. In regions of the optical fiber ribbon cable other than the connectorization regions, the center-to-center spacing of the optical fibers need not be maintained with any great degree of precision; but may be "imprecisely ribbonized."

In some embodiments, an optical fiber cable includes a plurality of optical fibers that are unribbonized except in designated connectorization regions. In the designated connectorization regions, the optical fibers are precisely ribbonized and maintained within center-to-center spacing tolerances as described above. In the unribbonized regions, the optical fibers may be more or less randomly arranged. In some versions of such embodiments, the unribbonized regions may be encased in a cylindrical sheathing, for example, from which they would fan out into their precisely aligned positions within a ribbonized connectorization region.

In an alternative embodiment, an optical fiber cable is fabricated in accordance with a coding system that reveals to an observer certain characteristics about the optical fiber cable; for example, the widths and heights of the optical fibers included therein, the center-to-center spacings of the optical fibers and the cross-sectional geometry of the optical fibers.

In one coded embodiment, each of the spacer fibers within a connectorization region is one of a first color and a second color and the spacer fibers are arranged in one of a prescribed plurality of color combinations in accordance with a predetermined coding system in which each of the prescribed color combinations of spacer fibers is indicative of an optical fiber cable having a unique set of characteristics. To increase the number of possible combinations in the code, alternative embodiments may be fabricated in which each of the spacer fibers within a connectorization region is one of three or more colors.

An optical fiber cable having at least one connectorization region for connectorization with a prefabricated multifiber terminal connector may be fabricated by one or more of the illustrative methods described below.

In one aspect, a method of fabricating an optical fiber cable having at least one connectorization region in which the optical fibers are precisely ribbonized may include the steps of: (i) providing a plurality of optical fibers for inclusion within the optical fiber cable, each of which optical fibers has a fiber center, a fiber height and a predetermined optical fiber width and each of which comprises a first material; (ii) predetermining the desired center-to-center spacing that adjacent optical fibers are to have when normally oriented in a substantially planar configuration in the at least one connectorization region; (iii) providing at least one spacer fiber comprised of a third material for positioning in lateral abutting relationship between first and second adjacent optical fibers within the plurality of optical fibers such that, with respect to each pair of first and second adjacent optical fibers to be spaced apart, one half the optical fiber width of the first optical fiber plus one half the optical fiber width of the second optical fiber plus the sum of the spacer fiber widths of the at least one spacer fiber to be abuttingly positioned between the first and second optical fibers is equal to the predetermined center-to-center spacing within a connectorization region; (iv) arranging and temporarily restraining, so as to prevent vertical, lateral, and longitudinal movement, the first and second optical fibers of each set of adjacent optical fibers to be spaced apart in lateral abutting relationship with at least one spacer fiber positioned therebetween such that the center-to-center spacing between the first and second optical fibers is within acceptable predetermined tolerances over some length along the at least one spacer fiber; and (v) applying an encapsulation layer comprising a second material to the restrained optical fibers and the at least one spacer fiber to form a precisely ribbonized connectorization region. The second material from which the encapsulation layer is fabricated is more soluble in a first solution than the first material from which the optical fibers are fabricated, and the third material from which the spacer fibers are fabricated is more soluble in a second solution than the first material. As previously mentioned in connection with methods of connectorization, the first, second and third materials from which the optical fibers, the encapsulation layer and the spacer fibers are respectively comprised may be such that a single, common solution will dissolve the encapsulation layer and the spacer fibers, but not the optical fibers.

An advantage of the present invention is that it provides an optical fiber cable having at least one connectorization region in which the center-to-center spacings of the optical fibers correspond to the center-to-center channel spacings of the corresponding channels in a multifiber terminal connector thereby simplifying connectorization to the terminal connector.

BRIEF DESCRIPTION OF THE DRAWINGS

FIG. 6 is a flowchart depiction of a method of connectorizing a multifiber terminal connector to an optical fiber cable;

FIGS. 7A through 7F are of an optical fiber cable undergoing connectorization to a multifiber terminal connector in accordance with the method shown in FIG. 6;

FIG. 8 is a flowchart depiction of a method of fabricating an optical fiber cable for connectorization to a multifiber terminal connector;

DETAILED DESCRIPTION

Figure 1:
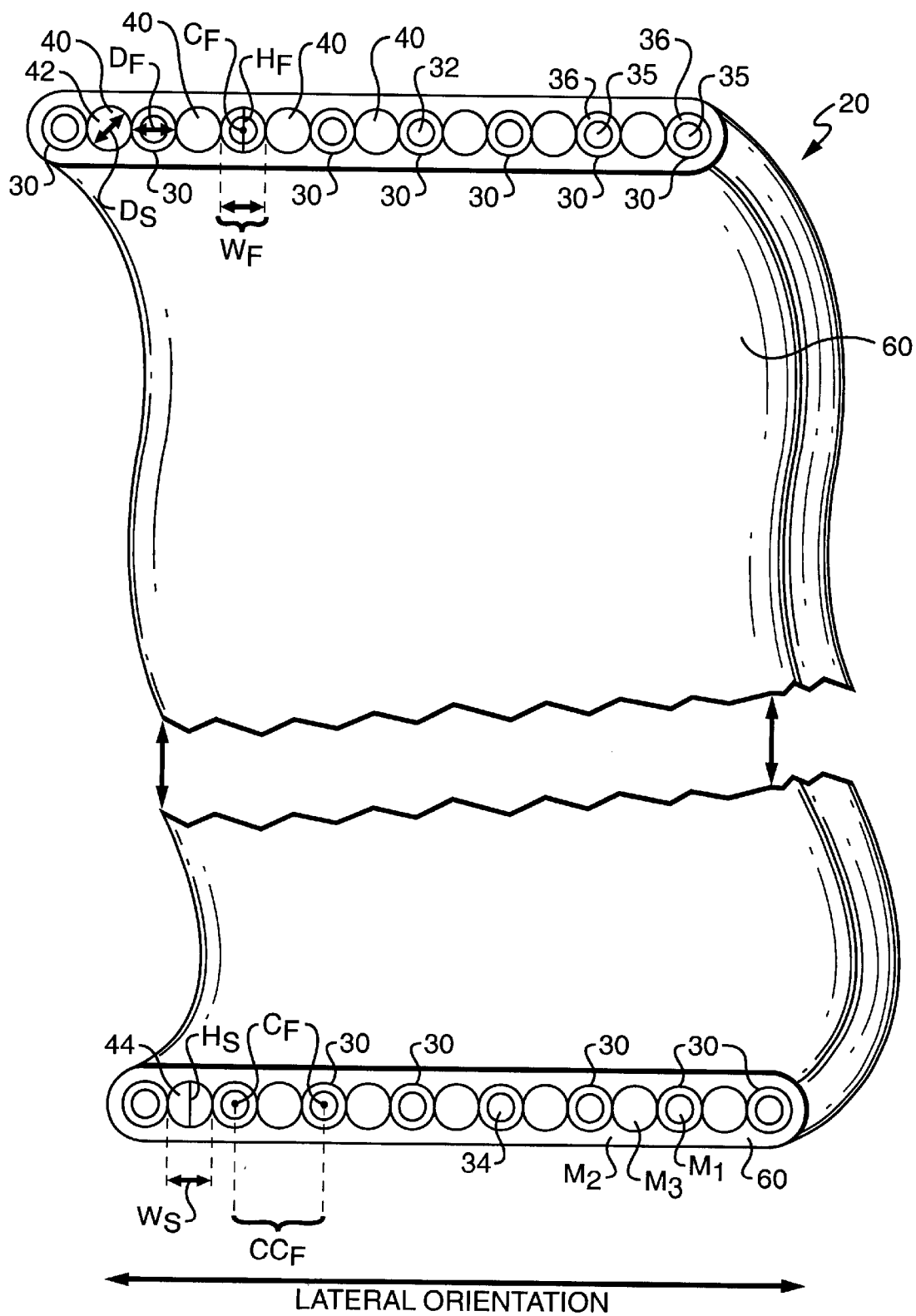
FIG. 1 shows an optical fiber ribbon cable.

An Optical Fiber Ribbon Cable for Connectorization to a Multifiber Terminal Connector Referring to FIGS. 1 through 10, an optical fiber ribbon cable 20 comprises at least two (i.e., a plurality) elongated, laterally spaced, adjacent wave-transmitting optical fibers 30. As shown in FIG. 1, each optical fiber 30 has a fiber width $W_F$, a fiber height $H_F$, and a fiber center $C_F$, and extends longitudinally between a first end 32 and a second end 34. Each of the optical fibers 30 shown in the drawings also includes a core 35 and a cladding 36. The lateral center-to-center spacings $CC_F$ between the fiber centers $C_F$ of two adjacent optical fibers 30 are maintained within predetermined tolerances by at least one, spacer fiber 40 abuttingly positioned between the adjacent optical fibers 30. Each spacer fiber 40 has a spacer width $W_S$ and a spacer height $H_S$ and extends longitudinally from a first spacer end 42 to a second spacer end 44. In situations in which the optical. fibers 30 are of round cross-section, as illustrated, the fiber width $W_F$ and the fiber height $H_F$ are equal to the fiber diameter $D_F$. Similarly, where the spacer fibers 40 are round, the spacer width $W_S$ and the spacer height $H_S$ are equal to the spacer diameter $D_S$. The optical fibers 30 and the spacer fibers 40 are arranged within the optical fiber ribbon cable 20 such that their respective widths $W_F$ and $W_S$ extend laterally and their heights $H_F$ and $W_S$ extend perpendicularly to their widths $W_F$ and $W_S$.

The optical fibers 30 and the spacer fibers 40 are maintained in their desired laterally adjacent positions, normally in a generally planar configuration, by an encapsulation layer 60. The encapsulation layer 60 may comprise any of numerous materials, but should be made flexible to allow the optical fiber ribbon cable 20 to twist and bend and to be rolled. Examples of suitable materials include plastic, epoxy or any of a variety of available polymers.

Figure 2:
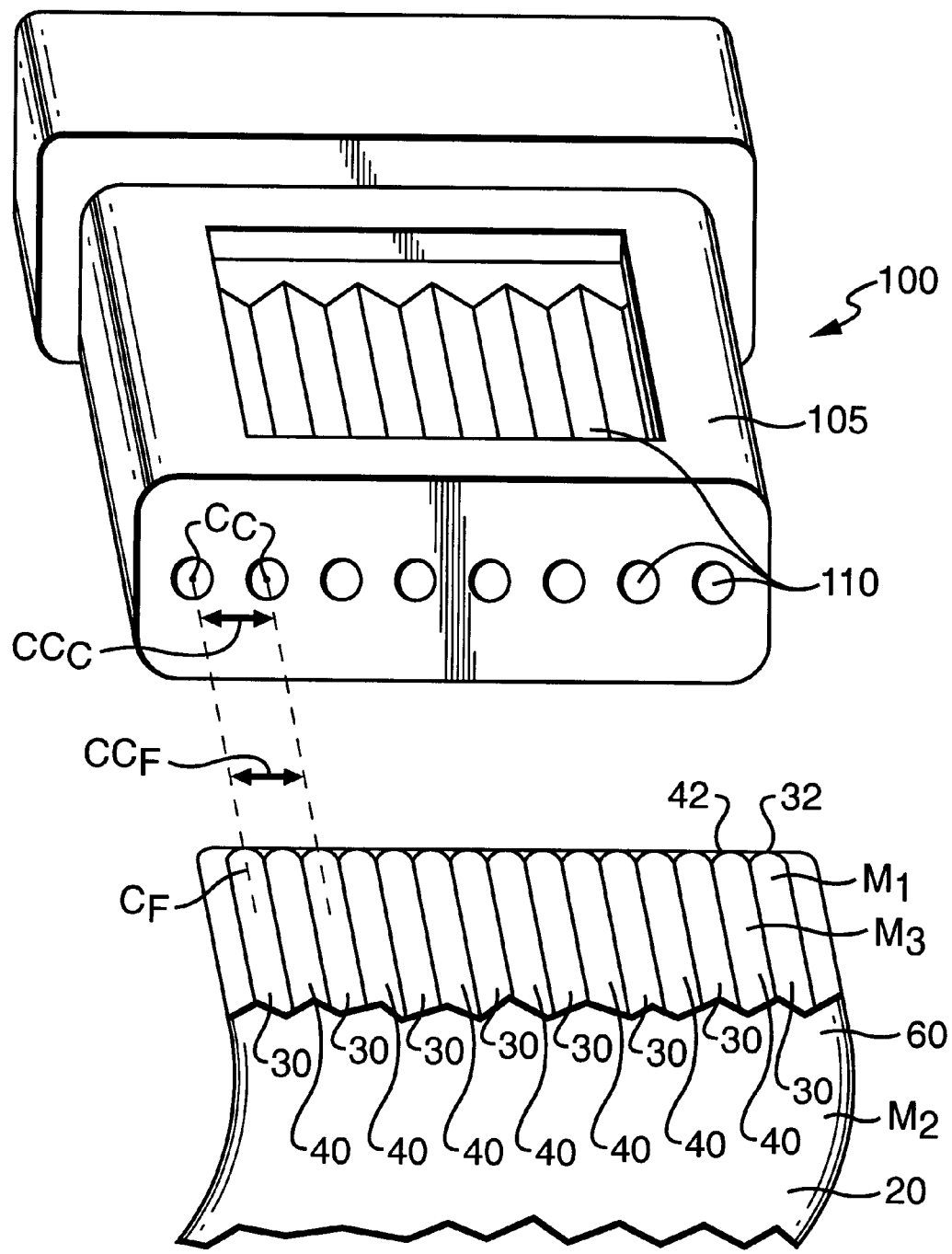
FIG. 2 shows an optical fiber ribbon cable and a multifiber terminal connector with which the optical fiber ribbon cable is to be connectorized.

In FIG. 2, a multifiber terminal connector 100 with which the ribbon cable 20 is to be connectorized is shown. The encapsulation layer 60 is partially cut away to show the optical fibers 30 and spacer fibers 40 therein. The multifiber terminal connector 100 includes a housing 105 with a plurality of laterally spaced fiber-receiving channels 110. In fabricating the ribbon cable 20, the widths (lateral dimension) of the spacer fibers 40 are predetermined such that, when the spacer fibers 40 are positioned in abutting relationship with the optical fibers 30, the lateral center-to-center spacing $CC_F$ between adjacent optical fibers 30 corresponds to the lateral center-to-center spacing $CC_C$ between the channel centers Cc of adjacent fiber-receiving channels 110 in the multifiber terminal connector 100 with which the ribbon cable 20 is to be connectorized. It will become apparent further in this description how this arrangement facilitates simplicity in connectorizing the ribbon cable 20 to the multifiber terminal connector 100.

Figure 3:
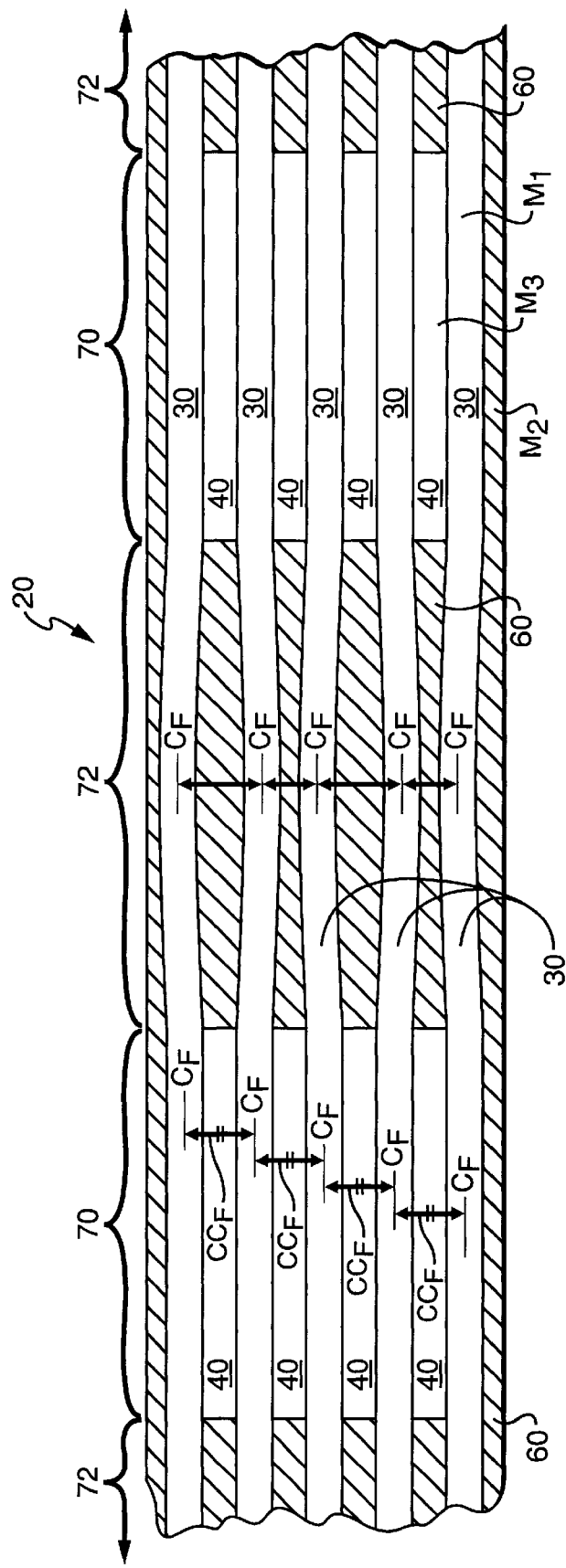
FIG. 3 shows a length of optical fiber ribbon cable including two connectorization regions.
Figure 4A:
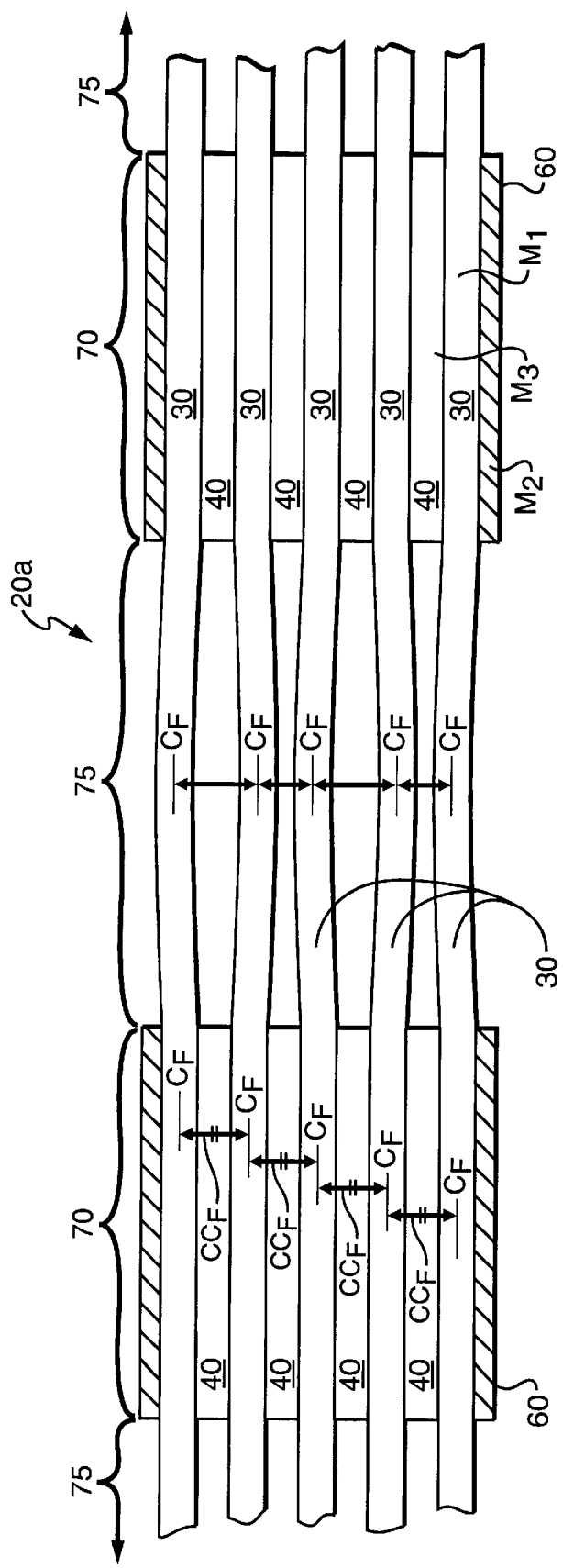
FIG. 4A shows an optical fiber cable including a plurality of optical fibers that are unribbonized except in designated connectorization regions.
Figure 4B:
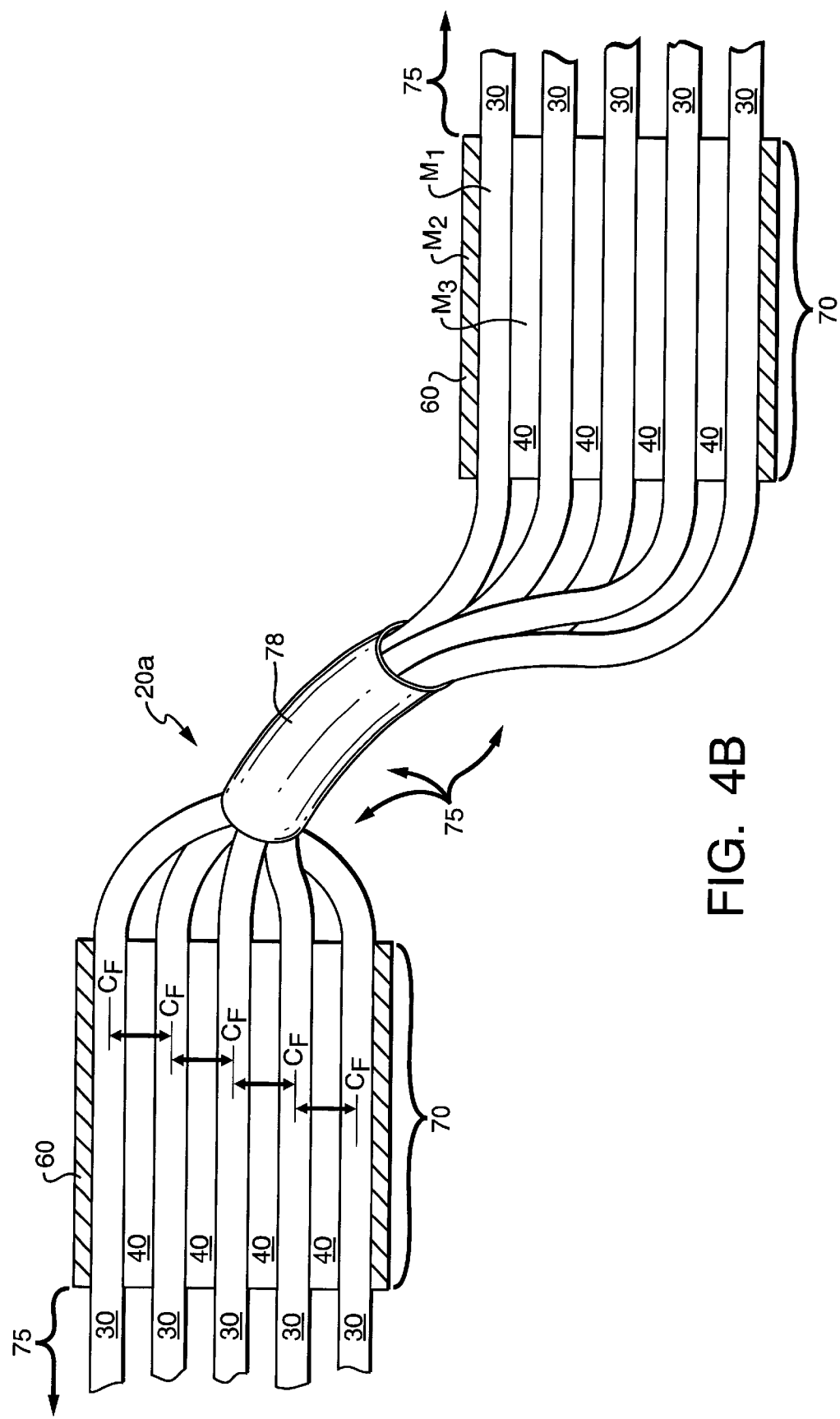
FIG. 4B shows an optical fiber cable having a sheathed, but unribbonized region between two connectorization regions.

In one embodiment, the optical fiber ribbon cable 20 includes spacer fibers 40 along its entire length. However, in alternative embodiments, the optical fiber ribbon cable 20 includes the spacer fibers 40 only in each of one or more connectorization regions 70, as shown in FIGS. 3, 4A and 4B. Referring to FIG. 3, there is shown an illustrative length of optical fiber ribbon cable 20 including two connectorization regions 70. Within the connectorization regions 70, the center-to-center spacings $CC_F$ of adjacent optical fibers 30 are maintained within predetermined tolerances by abutting engagement with spacer fibers 40 as described previously; that is, the optical fibers 30 are "precisely" ribbonized within the connectorization regions 70. However, in intermediate regions 72 of the fiber ribbon 20 outside the connectorization regions 70, the optical fibers 30 are supported by the encapsulation layer 60, but not intentionally within any predetermined center-to-center spacing $CC_F$ tolerances. That is, the optical fibers 30 are "imprecisely ribbonized" in the intermediate regions 72 adjacent the connectorization regions 70. In embodiments of optical fiber ribbon cable 20 having connectorization regions 70, as opposed to continuous precision spacing of optical fibers 30 throughout, it is desirable to include some indicia (e.g., coloration) by which a person can identify connectorization regions 70 within which to connectorize the ribbon cable 20. This could be achieved by coloring the encapsulation layer 60 within and/or outside the connectorization regions 70 or, if the encapsulation layer 60 is translucent, tinting one or more of the spacer fibers 40 encased therein, for example.

In another embodiment, such as that shown in FIG. 4A, an optical fiber cable 20a includes a plurality of optical fibers 30 that are unribbonized except in designated connectorization regions 70. Again, within the connectorization regions 70, the optical fibers 30 are precisely ribbonized and maintained within center-to-center spacing $CC_F$ tolerances as previously described. In the unribbonized regions 75, the optical fibers 30 may be randomly arranged or purposely arranged in other-than-ribbonlike configurations. Furthermore, in the unribbonized regions 75, the optical fibers 30 may be unsheathed, as shown in FIG. 4A, or sheathed, as shown in FIG. 4B, depending on the particular application for which the optical fiber cable 20a is to be used. FIG. 4B illustrates a particular example of the latter type in which an unribbonized region 75 is sheathed in a generally cylindrical sheath 78; the optical fibers 30 periodically "fanning out" from a disordered arrangement within a generally cylindrical configuration to the more ordered, generally planar orientation that they assume within the connectorization regions 70.

For reasons that will be more fully appreciated further in this description, materials are chosen from which to fabricate the spacer fibers 40 and the encapsulating layer 60 that are more soluble in certain chemical solutions than is the material from which the optical fibers 30 are fabricated. Specifically, the optical fibers 30 are fabricated from a first material $M_1$, the encapsulation layer 60 from a second material $M_2$ and the spacer fibers 40 from a third material $M_3$. In one version, the second material $M_2$ and the third material $M_3$ are each highly soluble in a first solution $S_1$ (e.g., a leaching agent or solvent) and a second solution $S_2$, respectively, or a common solution $S_C$, in which the first material $M_1$ is insoluble. For example, the third material $M_3$ from which the spacer fibers 40 are fabricated may be an acid soluble glass (i.e., an "ASG") and the second material $M_2$ from which the encapsulating layer 60 is made may be a material that is soluble in acid or acetone, while the first material $M_1$ from which the optical fibers 30 are fabricated is insoluble in both acid and acetone. Alternatively, the material $M_1$ from which the optical fibers 30 are fabricated may be insoluble in a common solution $S_C$ (e.g., an acid such as hydrochloric acid or nitric acid) in which both the second and third materials $M_2$ and $M_3$ from with the encapsulation layer 60 and the spacer fibers 40 are fabricated is soluble. In one version, the second material $M_2$ is the same as the third material $M_3$. The reason for these parameters is to facilitate methods of connectorizing an optical fiber cable 20/20a with a multifiber terminal connector 100 as described below.

There are numerous suitable and commercially available materials, including various optical-fiber-grade plastics and glasses that could be used as materials $m_l$, $M_2$ and $M_3$. Examples of three commercially known glasses that may be used are Pegasus EG1 and EG3, which might be used to make the spacer fibers 40, and Owens Corning SMF28, which might be used in the optical fibers 30. The Pegasus glasses and the Owens Corning glass are respectively soluble and insoluble in hydrochloric acid and nitric acid, for example. Similarly, $S_1$, $S_2$ and $S_C$ may be any one or more of various commercially available acids commonly used in the fiber optics and other industries where selective glass etching is employed. These examples are regarded as illustrative and non-limiting of the scope of the invention.

In one alternative embodiment, the materials $M_2$ and $M_3$ from which the encapsulation layer 60 and the spacer fibers 40 are fabricated may have softening temperatures $T_1$ and $T_2$ that are lower than the softening temperature of the material $M_1$ from which the optical fibers 30 are fabricated. In such cases, the encapsulation layer 60 and spacer fibers 40 could be removed by subjecting the relevant portion of a connectorization region 70 to temperatures $T_1$ and $T_2$ sequentially, or some common temperature $T_C$, that will melt the materials $M_2$ and $M_3$, but not the first material $M_1$. However, in such cases, care should be taken that the optical fibers 30 are not thermally stressed by the operation.

"Coded" Optical Fiber Cable

In an alternative embodiment, an optical fiber cable 20/20a includes one or more spacer fibers 40 of a different color or colors from other spacer fibers 40 within the optical fiber cable 20/20a to convey certain information about the optical fiber cable is 20/20a. For example, different combinations in the arrangement of tinted and untinted spacer fibers 40 could be used to indicate the number of optical fibers 30, the center-to-center spacings $CC_F$ of the optical fibers 30, the fiber diameters $D_F$ or fiber widths $W_F$ and fiber heights $H_F$, and the cross-sectional geometry of the optical fibers 30, for example. In this way, a person can make a decision as to which optical fiber cables 20/20a may be matched with a particular type of multifiber terminal connector 100 by examining the spacer fibers 40 themselves. In such embodiments, it may be advantageous to make the encapsulation layer 60 translucent so that an observer can inspect the spacer fibers 40 through the encapsulation layer 60.

Figure 5A:
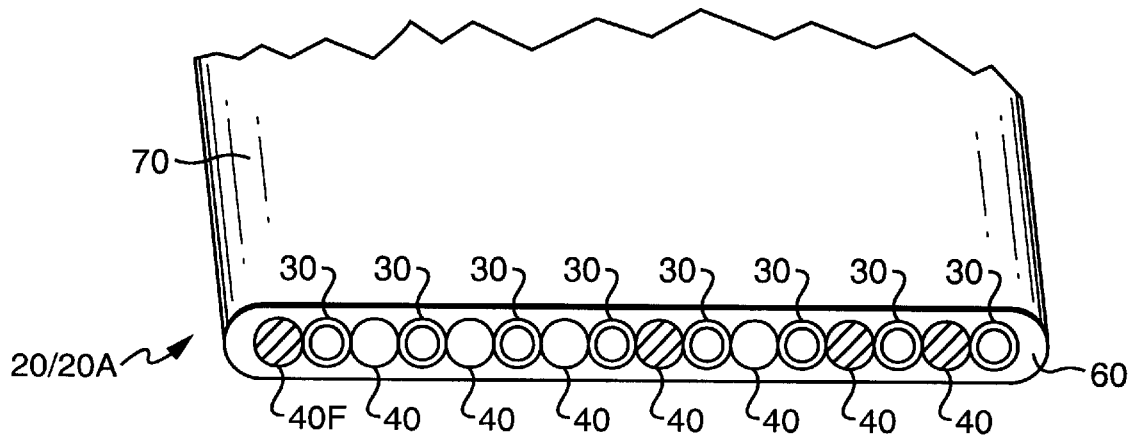
FIG. 5A shows an end view of a connectorization region including spacer fibers that are either tinted or untinted in accordance with a color coding system.

For purposes of demonstration, an end view of a connectorization region 70 of an optical fiber cable 20/20a including eight optical fibers 30 is shown in FIG. 5A. The optical fiber cable 20/20a further includes seven spacer fibers 40, each of which is abuttingly positioned between two adjacent optical fibers 30, and a fiducial spacer fiber 40F positioned laterally to the outside of one of the two outermost optical fibers 30 (i.e., the first or the eighth optical fiber 30 in this particular case). In this particular illustration, each spacer fiber 40 is either tinted or untinted. Although the inclusion of the fiducial spacer fiber 40F, which really does not serve to space optical fibers 30, is entirely optional, it will be appreciated that including it makes the connectorization region 70 asymmetrical, nearly doubling the number of possible combinations by orienting the optical fiber cable 20/20a.

Figure 5B:
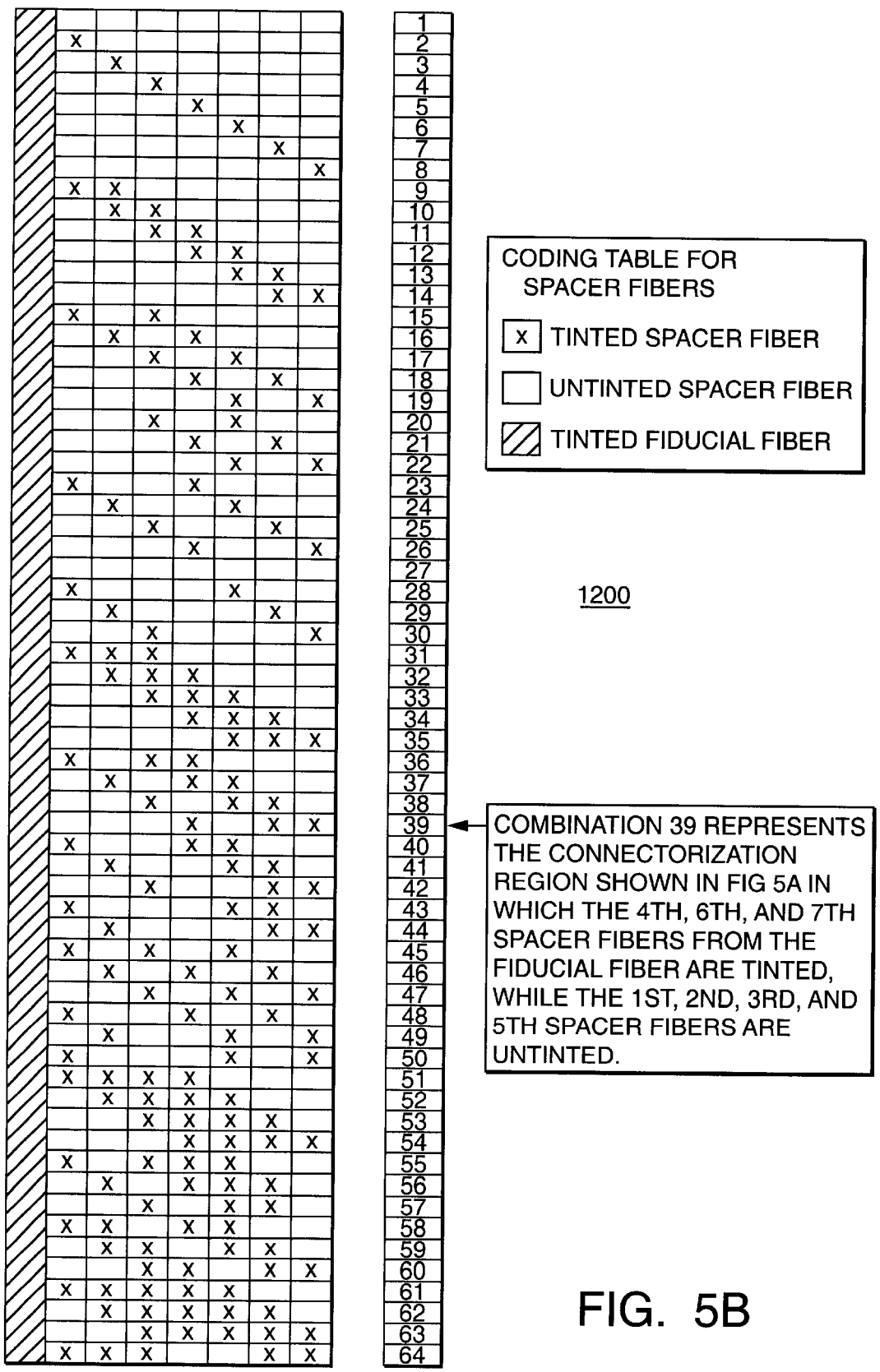
FIG. 5B shows a coding table of an illustrative coding system representing various possible combinations of tinted and untinted fibers.

Each combination is indicative of an optical fiber cable 20/20a having unique characteristics in accordance with a predetermined coding system in which different ordering arrangements of tinted and untinted spacer fibers 40 are indicative of different characteristics of the optical fiber cable 20/20a. To aid a user in interpreting the code, a coding table 1200 may be established and provided. FIG. 5B shows a table listing sixty-four possible arrangements of tinted and untinted spacer fibers 40 in the optical fiber cable 20/20a of FIG. 5A with the fiducial spacer fiber 40F being tinted. Referring to is the coding table 1200 and the accompanying legend, the fiducial spacer fiber 40F is represented as tinted in each of the sixty-four combinations shown. Within each row, each box is representative of a corresponding spacer fiber 40 in the actual optical fiber cable 20/20a of FIG. 5A. Empty boxes indicate that the corresponding spacer fiber 40 is untinted, while an "x" in a box indicates that the corresponding spacer fiber 40 is tinted. It will be appreciated that, while in the case of seven spacer fibers 40 that are either tinted or untinted, the total number of combinations is $2^7$ (i.e., 128), the number of possible combinations in this example could be significantly increased if the code were such that the spacer fibers 40 could be any of multiple colors. Furthermore, even in a coding system in which the only choices are either tinted or untinted for the spacer fibers 40, as in the example, the number of possible combinations could still be doubled to 256 by allowing the fiducial fiber 40F to be tinted or untinted as well. Obviously "tinted" and "untinted" are not the only two possible choices for the system illustrated above; it may, for example, be more advantageous to substitute black and yellow for tinted and untinted, for example. Finally, for purposes of this explanation, and more particularly the claims, "untinted" is considered a color.

The coding system functions in its simplest form when a first color is used to contrast with a second color. Again, the use of multiple contrasting colors is certainly within the scope and contemplation of the invention. The use of multiple-color coding may be useful in cases of optical fiber cables 20/20a having very few optical fibers 30, and correspondingly few spacer fibers 40; in such cases, two choices (e.g., tinted and untinted) may not provide enough combinations. As a very simple example, if an optical fiber cable 20/20a has only two spacer fibers 40 and one fiducial fiber 40F, a two-color system would provide $2^3$, or 8, combinations. The inclusion of one additional color to the code would provide $3^3$, or 27, possible combinations.

Another application of coding by including combinations of differently tinted spacer fibers 40, or tinted spacer fibers 40 in combination with untinted spacer fibers is 40, is to identify and track subgroups of optical fibers 30 on the split end of a cable of which the other end is a common end. In other words, an optical fiber cable 20/20a may begin at some common end with various branches, subgroups or sub-ribbons branching off at one or points along the length of the optical fiber cable 20/20a. Tinting and coding could be employed to track the optical fibers 30 and spacer fibers 40 of sub-ribbons back to their origins in the common end.

Method of Connectorizing an Optical Fiber Cable Having at Least One Connectorization Region to a Multifiber Terminal Connector Referring to FIGS. 6 and 7A through 7F, a method of connectorizing an optical fiber cable 20120a having at least one connectorization region 70 to a multifiber terminal connector 100 is now described. Since the method is equally applicable to optical fiber ribbon cables 20 that are precisely ribbonized throughout and optical fiber cables 20a that are precisely ribbonized only in one or more connectorization regions 70, it is acceptable for discussion to regard an optical fiber ribbon cable 20 that is precisely ribbonized along its entire length as having a single connectorization region 70. The steps of one method are illustrated in FIG. 6 in a flowchart format, while illustrations of an optical fiber cable 20/20a and a multifiber terminal connector 100 at various stages of the method of FIG. 6 being performed thereon are depicted in FIGS. 7A through 7F. It is to be understood that the order in which the steps are presented is not necessarily indicative of an order in which they must be performed. When and if one step must be performed prior to another step will readily manifest itself to one of ordinary skill in the art.

Figure 7A:
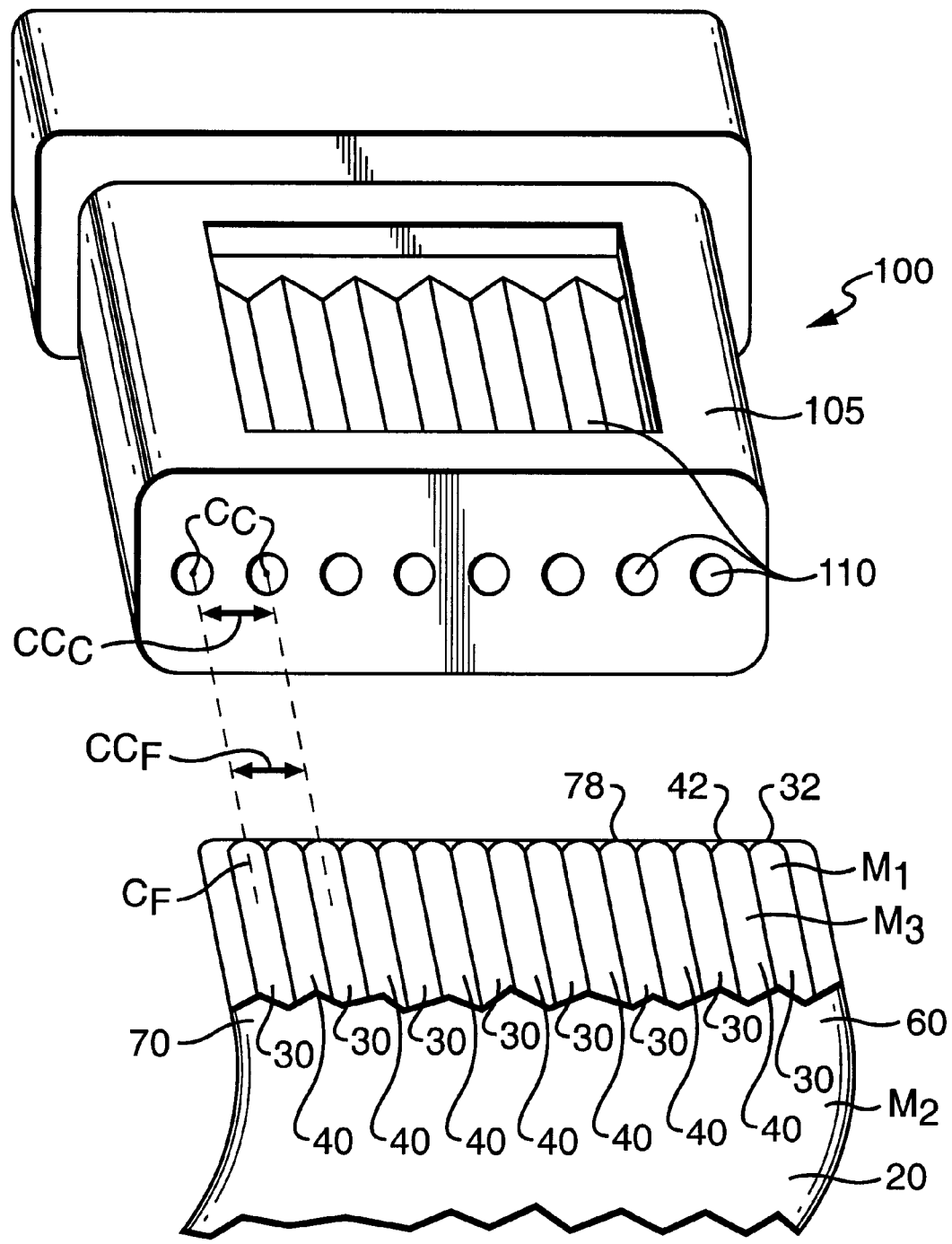

Referring now to FIGS. 6 and 7A, step 710 includes providing a multifiber terminal connector 100 adapted for terminating an end of an optical fiber ribbon and having a plurality of laterally spaced fiber-receiving channels 110 for receiving and supporting a plurality of optical fibers.

Step 720 includes providing an optical fiber cable 20/20a having at least one connectorization region 70 in which the optical fibers 30 of a plurality of adjacent, laterally spaced wave-transmitting optical fibers 30 fabricated from a first material $M_1$ are maintained with their fiber centers $C_F$ separated by distances that are within predetermined center-to-center spacing $CC_F$ tolerances by spacer fibers 40 fabricated from a third material $M_3$ abuttingly positioned between the optical fibers 30. The optical fibers 30 and the spacer fibers 40 are protected and held together in a generally planar configuration by an encapsulation layer 60 made from a second material $M_2$. The second and third materials $M_2$ and $M_3$ from which the encapsulation layer 60 and the spacer fibers 40 are respectively made are more soluble in a first solution $S_1$ and a second solution $S_2$, respectively, and/or a common solution $S_c$, than the first material $M_1$ from which the optical fibers 30 are made. The optical ribbon cable 20/20a is such that the center-to-center spacings $CC_F$ of the optical fibers 30 within the at least one connectorization region 70 correspond to the center-to-center spacings $CC_C$ of the fiber-receiving channels 110 of the multifiber terminal connector 100.

In order to prevent unacceptably high signal loss at an eventual signal interface of which the optical fibers 30 will form a part, the method should include a step 730 of providing an optically smooth end surface 78 generally perpendicular to the fiber axes within a connectorization region 70. This may be accomplished by cutting the optical fiber cable 20/20a perpendicularly to the fiber axes within a connectorization region 70. Alternatively, if the optical fiber cable 20/20a is all glass, for example, the optical fiber cable 20/20a may be scored within a connectorization region 70 and subjected to proper stress to break the ribbonized connectorization region 70 in a single motion in order to form the optically smooth end surface 78. With some multifiber terminal connectors 100, the end surface 78 may be made optically smooth after steps 750 and 760 below, but an end surface 78 of some kind, whether optically smooth or not, will still typically be required to perform step 740. As is often the case in practice, the end surface 78 will be made optically smooth after installation and securing in a multifiber terminal connector 100 by techniques such as by grinding and polishing, for example, and so, would be performed after step 760 below.

Once an acceptably smooth end surface 78 has been provided, the optical fiber cable 20/20a is further prepared for connectorization in accordance with step 740 by leaching a section of the connectorization region 70, beginning at the end surface 78 and extending along the connectorization region 70 for a leach-depth LD, in either (i) a single, common solution $S_C$ that will dissolve both the second and third materials $M_2$ and $M_3$ from which the encapsulation layer 60 and the spacer fibers 40 are respectively fabricated (FIG. 7B) or (ii) a first solution $S_1$ that will dissolve the encapsulation layer 60 and then a second solution $S_2$ that will dissolve the spacer fibers 40 (FIG. 7C). In either event, step 740 will leave remaining a generally planar array of laterally spaced optical fiber segments 38 protruding from the unleached portion of the connectorization region 70. As long as the leach depth LD is not too great, the lateral center-to-center spacing $CC_F$ of the protruding optical fiber segments 38 will still be within predetermined tolerances. That is, the center-to center spacings $CC_F$ at the optical fiber segments 38 will still correspond to the center-to-center spacings $CC_C$ of the fiber-receiving channels 110 in the multifiber terminal connector 100.

In alternative aspects, the materials $M_2$ and $M_3$ from which the encapsulation layer 60 and the spacer fibers 40 are fabricated may have softening temperatures $T_1$ and $T_2$ that are lower than the softening temperature of the material $M_1$ from which the optical fibers 30 are fabricated. In such cases, the encapsulation layer 60 and spacer fibers 40 could be removed by subjecting the relevant portion of a connectorization region 70 to temperatures $T_1$ and $T_2$ sequentially, or some common temperature $T_C$, that will melt ("leach") the materials $M_2$ and $M_3$, but not the first material $M_1$. However, in such cases, care should be taken that the optical fibers 30 are not thermally stressed by the operation. It should be noted that, for the purposes of this disclosure, the term "leach" is defined to include removal by melting.

Figure 7D:
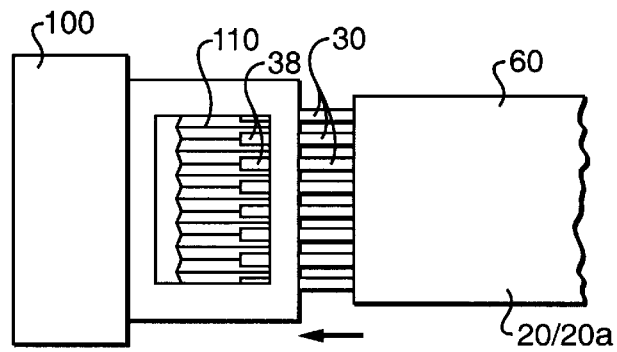
Figure 7E:
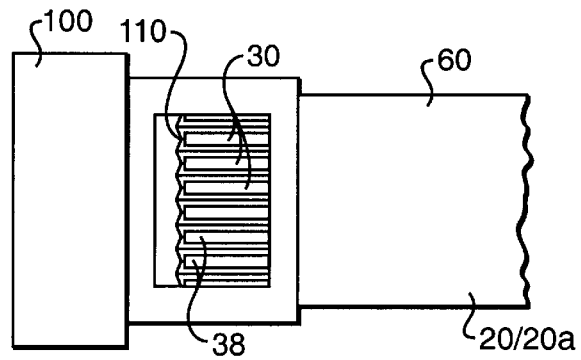

According to step 750, once the connectorization region 70 has been leached, the exposed optical fiber segments 38 are inserted into corresponding fiber-receiving channels 110 of the multifiber terminal connector 100 (FIGS. 7D and 7E).

Figure 7F:
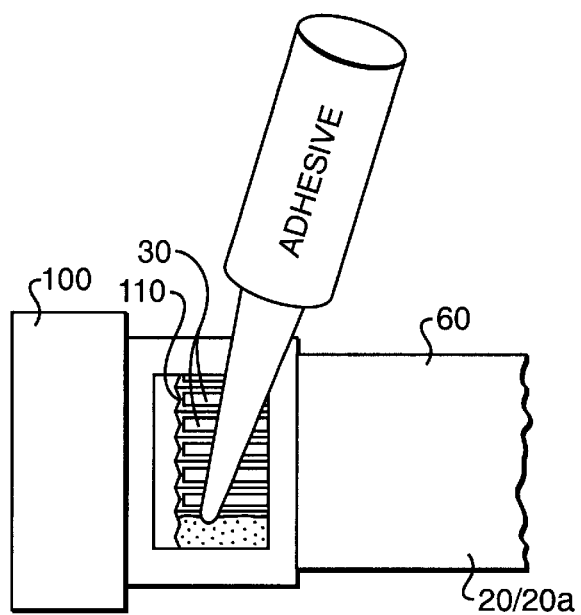

Securing the optical fiber segments 38 within their corresponding fiber-receiving channels 110 in accordance with step 760 completes connectorization of the optical fiber cable 20/20a. Securing the optical fiber segments 38 in accordance with step 760 may be accomplished by any of the industry standard methods, but examples include use of a "crimping," radiation-curable adhesive and/or an epoxy (FIGS. 7F).

Method of Fabricating an Optical Fiber Cable for Connectorization to a Multifiber Terminal Connector Referring to FIGS. 8 and 9A through 9D, a method of fabricating an optical fiber cable 20/20a for connectorization to a multifiber terminal connector 100 is described. The steps of the following method are generally applicable to the fabrication of each of (i) an optical fiber ribbon cable 20 with optical fibers 30 and spacer fibers 40 precisely ribbonized along the entire length of the ribbon cable 20, (ii) an optical fiber ribbon cable 20 having at least one connectorization region 70 in which connectorization region 70 the optical fibers 30 are maintained in predetermined alignment by spacer fibers 40 and (iii) an optical fiber cable 20a in which the optical fibers 30 are ribbonized only in one or more connectorization regions 70 and are otherwise not ribbonized. As with the method of connectorization, it is to be understood that the order in which the steps are presented below is not necessarily indicative of an order in which the steps must be performed.

Referring to FIGS. 8 and 9A through 9D, the desired optical fiber width $W_F$ (i.e., the optical fiber diameter $D_F$ in the case of round optical fibers 30) and the desired center-to-center spacings $CC_F$ of the optical fibers 30 in an at least one connectorization region 70 of optical fiber cable 20/20a to be fabricated is predetermined in accordance with step 810. In step 820, spacer fibers 40 of appropriate spacer fiber widths $W_S$ are selected for positioning in lateral abutting relationship between adjacent optical fibers 30. Generally, an "appropriate" spacer fiber width(s) $W_S$ is/are such that, with respect to two adjacent optical fibers 30 to be spaced apart, one half the optical fiber width $W_F$ of a first optical fiber 30-A plus one half the optical fiber width $W_F$ of the second optical fiber 30-B plus the sum of the spacer fiber widths $W_S$ of the one or more spacer fibers 40 to be abuttingly positioned between the first and second optical fibers 30 is equal to the desired center-to-center spacing $CC_F$ of adjacent optical fibers 30 within a connectorization region 70. That is, $$CC_F = \tfrac{1}{2}(W_F \text{ of } 30A) + \tfrac{1}{2}(W_F \text{ of } 30B) + \Sigma(W_S \text{ of the spacer fibers bet. } 30A \text{ and } 30B)$$

When optical fibers 30 of equal optical fiber width $W_F$ are to be spaced apart by either a single spacer fiber 40 or two or more spacer fibers 40 of equal spacer fiber width $W_S$, an "appropriate" spacer fiber width $W_S$ is such that two-times half the optical fiber width $W_F$ of the optical fibers 30 plus the spacer fiber width $W_S$ of one or more of the spacer fibers 40 is equal to the desired center-to-center spacing $CC_F$ of adjacent optical fibers 30 within a connectorization region 70. That is, $$CC_F = (1 \times F_W) + (W_S \times \text{(total number of spacer fibers)})$$

Figure 9A:
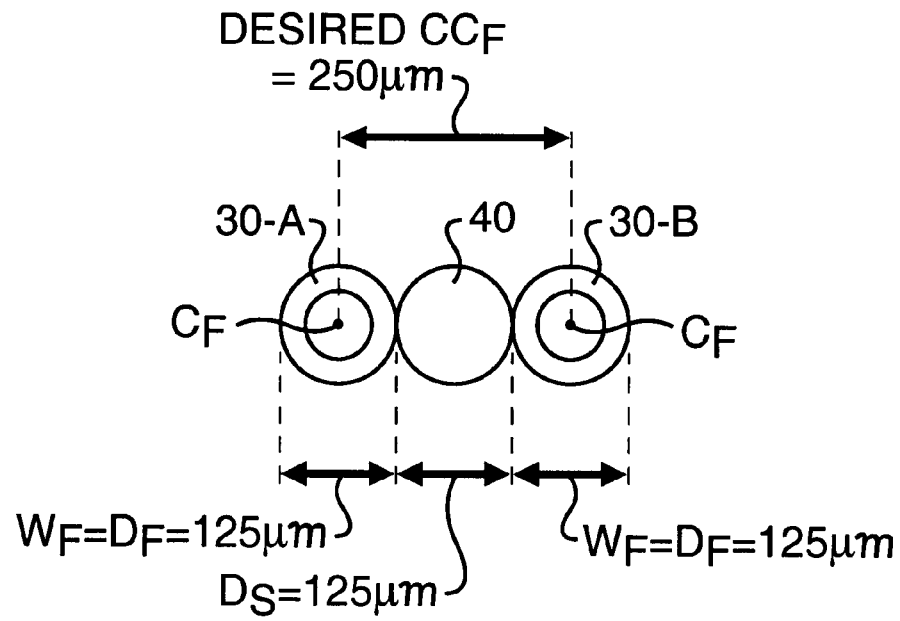
FIGS. 9A through 9D illustrate various spacing arrangements of optical fibers and spacer fibers.

For the purposes of illustration and discussion, unless otherwise specified, the simpler, immediately preceding case is assumed. FIGS. 9A to 9D depict illustrative examples. In FIG. 9A, the desired optical fiber width $W_F$ is 125 microns and the desired center-to-center spacings $CC_F$ between adjacent optical fibers 30 within a connectorization region 70 is 250 microns. In this case, it is appropriate to use round optical fibers 30 having a fiber diameter $D_F$ of 125 microns and a single round spacer fiber 40 having a spacer diameter $D_S$ of 125 microns. When two optical fibers 30 are abuttingly positioned with a single spacer fiber 40 located therebetween, in a substantially planar cross-sectional orientation, the center-to-center spacing $CC_F$ of the two optical fibers 30 will be the desired 250 microns.

Figure 9B:
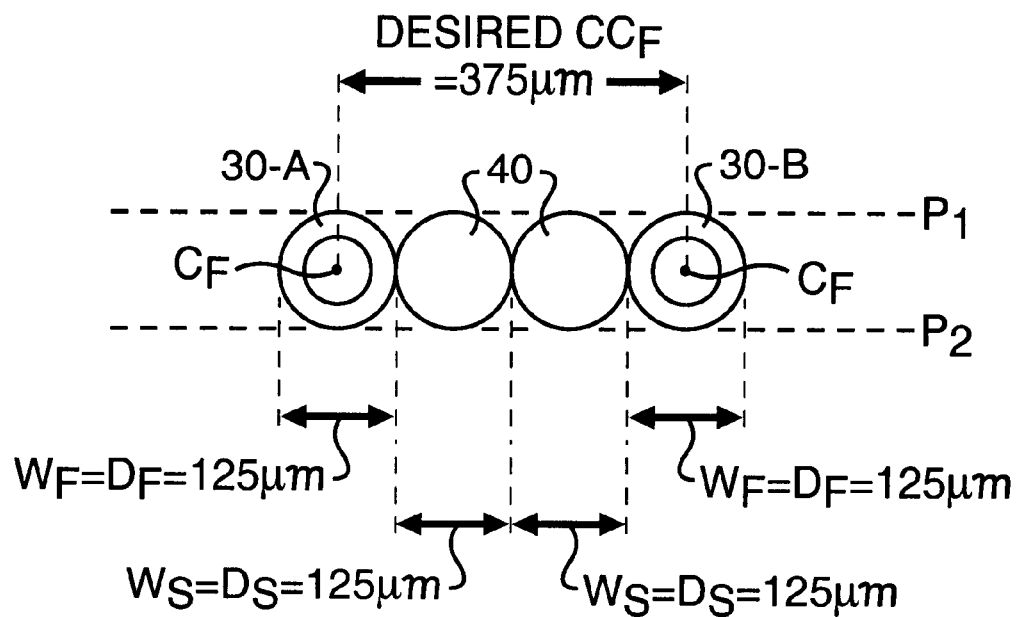
Figure 9C:
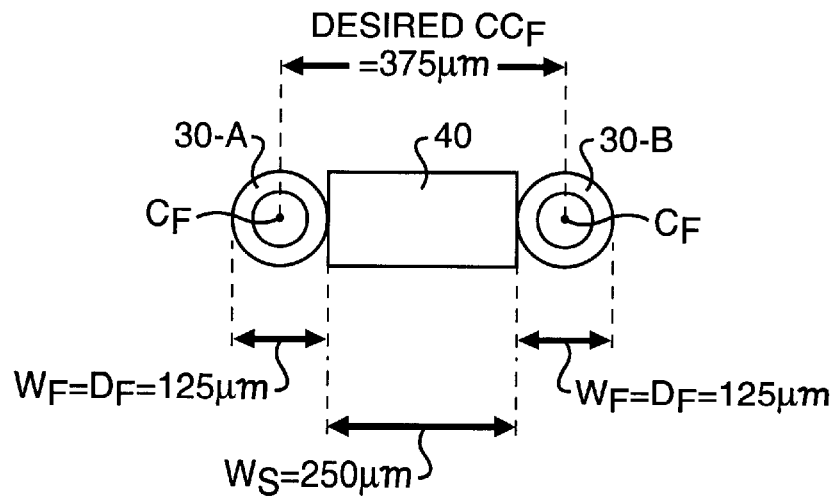
Figure 9D:
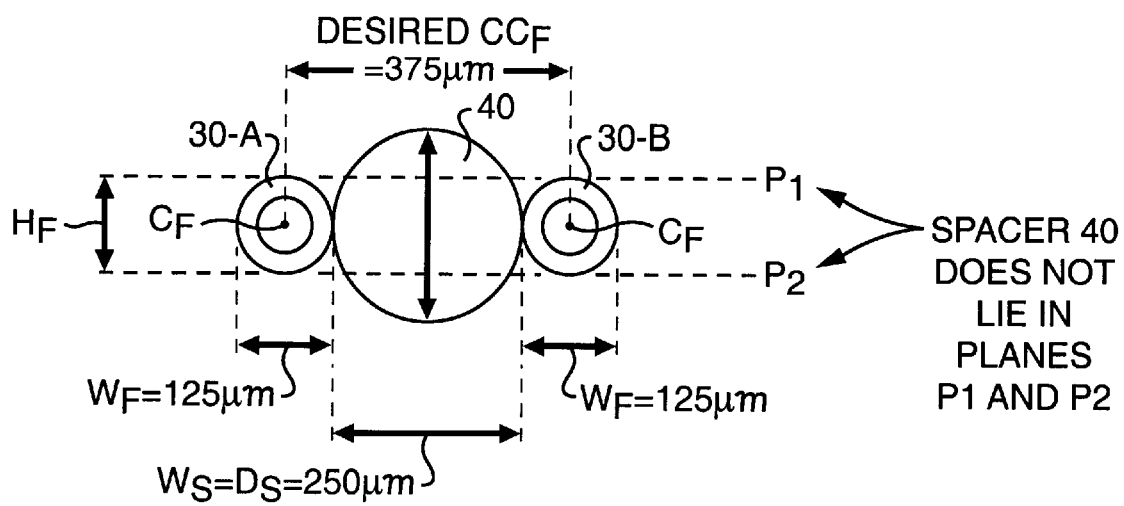

In a second example, illustrated in FIGS. 9B and 9C, the desired optical fiber width $W_F$ is again 125 microns and the desired center-to-center spacing is now 375 microns. In this case, it is appropriate to use either two round spacer fibers 40 having a spacer diameter $D_S$ of 125 microns each, as shown in FIG. 9B or, as shown in FIG. 9C, a single spacer fiber 40 of rectangular cross-section having a spacer width $W_S$ of 250 microns. Since it will be appreciated that having the tops and bottoms of the optical fibers 30 and the spacer fibers 40 lie substantially in parallel planes (e.g., P1 and P2 of FIG. 9B), it would not be desirable in this case to separate the fiber centers $C_F$ of two adjacent optical fibers 30 by using a single round spacer fiber 40 having a spacer diameter $D_S$ of 250 microns as illustrated in FIG. 9D, for example. Based on the scenario illustrated in FIG. 9D, it will be generally appreciated that, when it is desired to fabricate a connectorization region 70 using optical fibers 30 of a particular fiber width $W_F$ separated by a desired center-to-center spacing $CC_F$ that is such that the center-to-center spacing $CC_F$ minus one optical fiber width $W_F$ is not substantially equal to some whole number multiple (including 1) of the height of the optical fibers $H_F$, then round spacer fibers 40 are probably not appropriate. Again, this observation applies to the case in which the optical fiber widths $W_F$ are equal and the spacer fiber widths $W_S$ are equal.

To facilitate the connectorization of the fiber ribbon cable 20/20a to an industry-standard or custom-manufactured multifiber terminal connector 100, it is advantageous to predetermine that the center-to-center spacings $CC_F$ of the optical fibers 30 within a connectorization region 70 will correspond to the center-to-center spacings $CC_C$ of the fiber-receiving channels 110 of the multifiber terminal connector 100.

In step 830, at least two optical fibers 30 are arranged, and temporarily restrained in precision alignment—in lateral abutting relationship—over some length with at least one spacer fiber 40 positioned therebetween such that the optical fiber widths $W_F$ and the spacer fiber width(s) $W_S$ all extend in the same, lateral direction and such that the center-to-center spacing $CC_F$ between the adjacent optical fibers 30 is within acceptable predetermined tolerances. This step may be performed, for example, by feeding optical fibers 30 and spacer fibers 40 through a guide comb or by manually arranging and retaining the optical fibers 30 and spacer fibers 40 in a clamp and using a shim to maintain the optical fibers 30 and the spacer fibers 40 in lateral abutting relationship within the clamp.

To form at least one connectorization region 70, an encapsulation layer 60 is applied to the aligned/restrained optical fibers 30 and spacer fiber(s) 40 in accordance with step 840 to permanently support them in the positions desired.

Numerous methods of precisely aligning and temporarily restraining optical fibers 30 are known in the art and may be applied to perform step 830. Similarly, there are various known methods of encasing optical fibers 30 in order to create optical fiber ribbons which may be applied to accomplish step 840. Illustrative examples of each are now provided.

Generally, individual optical fibers 30 and spacer fibers 40 may be passed through a guiding comb or organizing shuttle and drawn into abutting engagement or, they may be clamped in their desired positions in order to temporarily restrained them for application of an encapsulation layer 60. The method used to arrange and retain the optical fibers 30 and spacer fibers 40 may depend, in part, on the nature of the encapsulation layer 60 which may be a pair of adhesive tape layers, a single adhesive tape folded over the optical fibers 30 and the spacer fibers 40, or a coating layer applied in a liquid state to form a film over the optical fibers 30 and the spacer fibers 40 such as an adhesive, plastic or other polymer, for example. Below a specific method of fabrication using a fiber arranger is described to provide only a single example of fabrication.

Specific Example of a Fabrication Method

Figure 10:
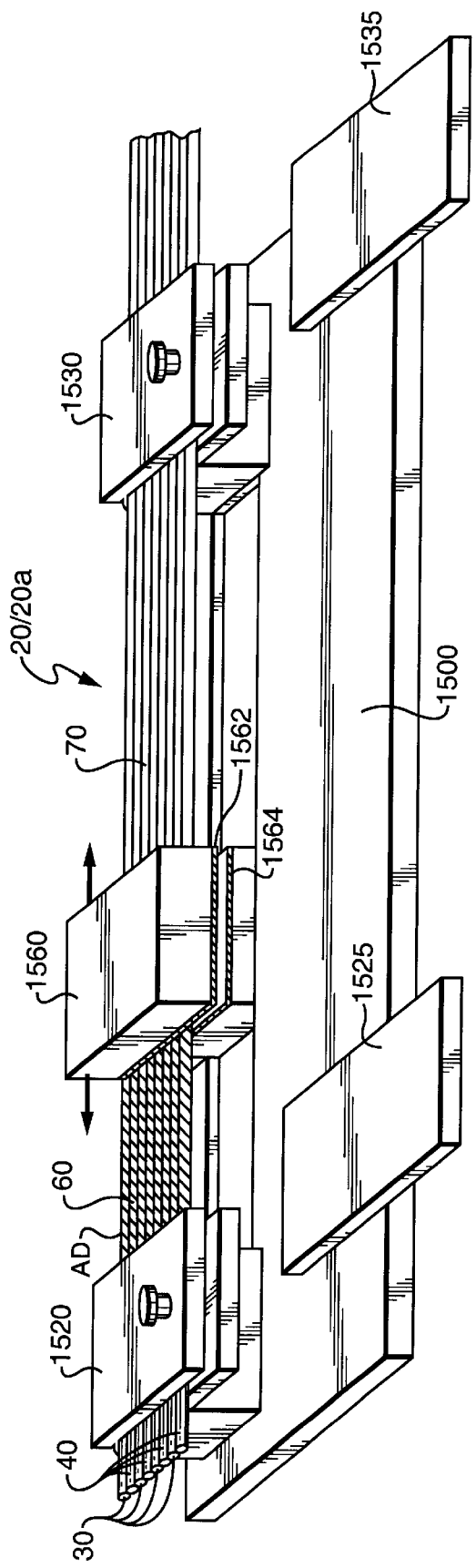
FIG. 10. illustrates a fiber arranger and a plurality of optical fibers and spacer fibers retained therein.

Referring to FIG. 10, an optical fiber cable 20/20a having at least one connectorization region 70 is fabricated using a fiber arranger 1500 having longitudinally spaced fiber clamps 1520 and 1530. The fiber arranger 1500 in the example further includes an adhesive-applying shuttle 1560 that is longitudinally reciprocable between the clamps 1520 and 1530 for depositing a layer of adhesive AD to an array of optical fibers retained by the clamps 1520 and 1530. An example of such a fiber arranger is the Sumitomo FTA-02 Fiber Arranger available from Sumitomo Electric Fiber Optics Corp. The FTA-02 or similar fiber arranger 1500 is suitable for the fabrication of connectorization regions 70. FIG. 10 illustrates how such a fiber arranger 1500 may be used to fabricate a connectorization 70.

A connectorization region 70 may be fabricated by first clamping the desired arrangement of optical fibers 30 and spacer fibers 40 in clamp 1520. The optical fibers 30 and spacer fibers 40 can be urged into lateral abutting engagement within the clamp 1520 by a shim 1525 that can fit between the jaws of the clamp 1520. Once the optical fibers 30 and spacer fibers 40 are in lateral abutting engagement, the clamp 1520 is tightened to retain them in place. Further along the length of the optical fibers 30 and the spacer fibers 40, the optical fibers 30 and spacer fibers 40 are fed between the jaws of the other clamp 1530 and drawn taut. Similarly, the optical fibers 30 and spacer fibers 40 may be urged into abutting relationship by a shim 1535. Once the optical fibers 30 and spacer fibers 40 are drawn taut and urged into lateral abutting engagement, the clamp 1530 is tightened to retain the tension on the optical fibers 30 and spacer fibers 40 and the abutting engagement of the same.

To ribbonize the optical fibers 30 and spacer fibers 40 along the length between the clamps 1520 and 1530, a polymer adhesive/epoxy AD, for example, is applied to each of two juxtaposed applicator pads 1562 and 1564 of the adhesive-applying shuttle 1560. The applicator pads 1562 and 1564 are juxtaposed with the optical fibers 30 and the spacer fibers 40 to be ribbonized sandwiched therebetween. The adhesive-applying shuttle 1560 is then reciprocated between the clamps 1520 and 1530 to apply the adhesive AD to the optical fibers 30 and spacer fibers 40. Once applied, the adhesive is cured, the clamps 1520 and 1530 are loosened and the ribbonized connectorization 70 freed from the fiber arranger 1500. In this case, the adhesive AD constitutes an encapsulation layer 60.

The foregoing is considered to be illustrative of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention as expressed in the appended claims.

What is claimed is:

1. An elongated optical fiber cable for connectorization to a multifiber terminal connector having a plurality of laterally spaced fiber-receiving channels, the optical fiber cable comprising:

at least two elongated optical fibers comprising a first optical fiber and a second optical fiber, each optical fiber having first and second ends, a fiber center, a fiber width and a fiber height and being fabricated from a first material;

at least one connectorization region including at least one spacer fiber fabricated from a third material and having a length, a spacer center, a width and a height, the at least one spacer fiber being abuttingly positioned between the first and second optical fibers to maintain the fiber centers of the adjacent optical fibers within predetermined lateral center-to-center spacing tolerances along the length of the at least one spacer fiber; and an encapsulation layer fabricated from a second material supporting the optical fibers and the at least one spacer fiber in their predetermined relative positions, the second and third materials being at least one of (i) respectively more soluble than the first material in a first solution and a second solution and (ii) more soluble in a common solution than the first material from which the optical fibers are fabricated.

2. The optical fiber cable of claim 1 wherein the optical fibers are insoluble in the first and second solutions.

3. The optical fiber cable of claim 1 wherein the optical fibers are insoluble in the common solution.

4. The optical fiber cable of claim 1 wherein the optical fibers and the at least one spacer fiber within the at least one connectorization region are ribbonized such that the optical fiber centers and the spacer center of the at least one spacer fiber are normally maintained in a substantially planar orientation in the lateral direction, but flexible in at least the longitudinal direction.

5. The optical fiber cable of claim 1 wherein the center-to-center spacings maintained between adjacent optical fibers within the at least one connectorization region correspond to the center-to-center spacings of the fiber-receiving channels of a multifiber terminal connector with which the optical fiber cable is to be connectorized.

6. The optical fiber cable of claim 1 wherein the optical fiber cable is an optical fiber ribbon cable and the at least one connectorization region is a single connectorization region that extends over the entire length of the optical fiber cable.

7. The optical fiber cable of claim 1 wherein the optical fiber cable is an optical fiber ribbon cable including at least two connectorization regions in which the adjacent optical fibers and the at least one spacer fiber are precisely ribbonized so as to maintain the fiber centers within the predetermined lateral center-to-center spacing tolerances and an intermediate region between the at least two connectorization regions in which the optical fibers are imprecisely ribbonized such that they are not intentionally maintained within predetermined lateral center-to-center spacing tolerances and wherein the encapsulation layer extends over the at least two connectorization regions and the intermediate region.

8. The optical fiber cable of claim 7 further including indicia distinguishing the at least two connectorization regions from the at least one intermediate region to assist persons in identifying an appropriate location for connectorization of the optical fiber cable with a multifiber terminal connector.

9. The optical fiber cable of claim 1 including at least two connectorization regions in which the adjacent optical fibers and the at least one spacer fiber are precisely ribbonized so as to maintain the fiber centers within the predetermined lateral center-to-center spacing tolerances and an unribbonized region between the at least two connectorization regions in which the optical fibers are not ribbonized and not intentionally maintained within predetermined lateral center-to-center spacing tolerances.

10. The optical fiber cable of claim 9 wherein the optical fibers within the unribbonized region are at least one of (i) randomly arranged and sheathed, (ii) randomly arranged and unsheathed, (iii) sheathed and purposely arranged in an other-than ribbonlike configuration and (iv) unsheathed and purposely arranged in an other-than ribbonlike configuration.

11. The optical fiber cable of claim 1 including at least two spacer fibers wherein each spacer fiber within the at least one connectorization region is one of a first color and a second color and the spacer fibers are arranged in one of a prescribed plurality of color combinations in accordance with a predetermined coding system in which each of the prescribed color combinations of spacer fibers is indicative of an optical fiber cable having a unique set of characteristics.

12. The optical fiber of claim 11 further including a fiducial spacer fiber positioned laterally to the outside of an outermost optical fiber in the at least one connectorization region to orient the at least one connectorization region.

13. The optical fiber cable of claim 1 wherein each spacer fiber within the at least one connectorization region is one of a three or more colors and the spacer fibers are arranged in one of a prescribed plurality of color combinations in accordance with a predetermined coding system in which each of the prescribed color combinations of spacer fibers is indicative of an optical fiber cable having a unique set of characteristics.

14. The optical fiber of claim 13 further including a fiducial spacer fiber positioned laterally to the outside of an outermost optical fiber in the at least one connectorization region to orient the at least one connectorization region.

15. The optical fiber cable of claim 1 wherein the encapsulation layer comprises at least one of (i) at least one adhesive tape layers, (ii) an adhesive coating layer, (iii) an epoxy coating layer, (iv) a plastic deposition (v) thermoplastic adhesive, and (vi) a radiation-curing adhesive.

16. The optical fiber cable of claim 1 wherein the second material from which the encapsulation layer is made is the same material from which the at least one spacer fiber is made.

17. A method of connectorizing a multifiber terminal connector to an optical fiber cable comprising the steps of:

providing a multifiber terminal connector adapted for terminating an optical fiber ribbon cable and having a plurality of spaced fiber-receiving channels for receiving and supporting a corresponding plurality of optical fibers;

providing an optical fiber cable having at least one connectorization region in which at least two adjacent optical fibers having fiber centers are maintained with their fiber centers separated by a distance that is within predetermined center-to-center spacing tolerances by at least one spacer fiber abuttingly positioned between the adjacent optical fibers, the optical fibers and the at least one spacer fiber being normally supported in a generally planar configuration by an encapsulation layer, the optical fibers, encapsulation layer and the at least one spacer fiber being fabricated from first, second and third materials respectively;

providing an end surface generally perpendicular to the fiber axes within a connectorization region of the at least one connectorization regions;

leaching a section of the connectorization region beginning at the end surface and extending along the connectorization region for a leach-depth in one of (i) a single, common solution that will dissolve both the second and third materials from which the encapsulation layer and the spacer fibers are fabricated, but not the first material from which the optical fibers are fabricated and (ii) a first solution that will dissolve the encapsulation layer and a second solution that will dissolve the spacer fibers, but neither of which first and second solutions will dissolve the optical fibers, such that there remain exposed fiber segments of the at least two optical fibers protruding from an unleached remainder of the connectorization region;

inserting the protruding fiber segments into corresponding fiber-receiving channels of the multifiber terminal connector; and securing the optical fiber segments within their corresponding fiber receiving channels.

18. The method according to claim 17 wherein the step of providing an end surface further includes providing an optically smooth end surface prior to leaching a section of the connectorization for a leach-depth.

19. A method of fabricating an optical fiber cable having at least one ribbonized connectorization region for connectorizing with a multifiber terminal connector comprising the steps of:

providing a plurality of optical fibers for inclusion within the optical fiber cable, each of which has a fiber center, a fiber height and a predetermined optical fiber width, the optical fibers being fabricated from a first material;

predetermining the desired center-to-center spacing that adjacent optical fibers are to have within the at least one connectorization region;

providing at least one spacer fiber fabricated from a third material for positioning in abutting relationship between first and second adjacent optical fibers within the plurality of optical fibers such that, with respect to each set of first and second adjacent optical fibers to be spaced apart, one half the optical fiber width of the first optical fiber plus one half the optical fiber width of the second optical fiber plus the sum of the spacer fiber widths of the at least one spacer fiber to be abuttingly positioned between the first and second optical fibers is equal to the predetermined center-to-center spacing within a connectorization region;

arranging and temporarily restraining the first and second optical fibers of each set of adjacent optical fibers to be spaced apart in lateral abutting relationship with at least one spacer fiber positioned therebetween such that the center-to-center spacing between the first and second optical fibers is within acceptable predetermined tolerances over some length along the at least one spacer fiber; and applying an encapsulation layer comprising a second material to the restrained optical fibers and the at least one spacer fiber to form a connectorization region in which the optical fibers and the at least one spacer fiber are supported by the encapsulation layer in abutting relationship, the second material from which the encapsulation layer is fabricated being more soluble in a first solution than the first material and the third material from which the spacer fibers are fabricated being more soluble in a second solution than the first material.

20. The method of claim 19 wherein the first and second solutions are the same.

21. The method of claim 19 wherein the second material from which the encapsulation layer is made is the same as the third material from which the at least one spacer fiber is made.

* * * * *